United States Patent
Rogacs et al.

(10) Patent No.: US 10,828,639 B2
(45) Date of Patent: Nov. 10, 2020

(54) TARGET CONSTITUENT LOCATION AND DISCHARGE

(71) Applicant: Hewlett-Packard Development Company, L.P., Houston, TX (US)

(72) Inventors: Anita Rogacs, Palo Alto, CA (US); Alexander Govyadinov, Corvallis, OR (US)

(73) Assignee: Hewlett-Packard Development Company L.P., Spring, TX (US)

( * ) Notice: Subject to any disclaimer, the term of this patent is extended or adjusted under 35 U.S.C. 154(b) by 205 days.

(21) Appl. No.: 15/546,882

(22) PCT Filed: Apr. 30, 2015

(86) PCT No.: PCT/US2015/028662
§ 371 (c)(1),
(2) Date: Jul. 27, 2017

(87) PCT Pub. No.: WO2016/175864
PCT Pub. Date: Nov. 3, 2016

(65) Prior Publication Data
US 2018/0043362 A1 Feb. 15, 2018

(51) Int. Cl.
*B01L 3/00* (2006.01)
*G01N 35/00* (2006.01)
(Continued)

(52) U.S. Cl.
CPC ... *B01L 3/502761* (2013.01); *B01L 3/502753* (2013.01); *B01L 3/0268* (2013.01);
(Continued)

(58) Field of Classification Search
CPC ....... G01N 3/502761; G01N 3/502753; G01N 3/0268; G01N 35/00; G01N 33/48; G01N 1/10; G01N 1/22; B01L 3/00
See application file for complete search history.

(56) References Cited

U.S. PATENT DOCUMENTS 6,258,263 B1 * 7/2001 Henderson ......... G01N 30/6043
204/451
7,150,812 B2 12/2006 Huang et al.
(Continued)

FOREIGN PATENT DOCUMENTS

CN 1720438 1/2006
CN 101693239 4/2010
(Continued)

OTHER PUBLICATIONS

McGuinness et al., Microfluidic Sensing Device, Appln. No. PCT/US2014/137848, filed Jan. 30, 2014.
(Continued)

*Primary Examiner* — Brian J. Sines
(74) *Attorney, Agent, or Firm* — Dicke Billig & Czaja PLLC

(57) ABSTRACT

A fluid exit passage is at a location along a microfluidic channel. A fluid displacement device is proximate the location along the microfluidic channel. A constituent locator distinguishes a target constituent in a fluid within the microfluidic channel from remaining non-target constituents and locate the target constituent proximate the fluid exit passage. A controller selectively actuates the fluid displacement device when the target constituent is proximate the fluid exit passage to discharge the target constituent from the microfluidic channel through the fluid exit passage.

13 Claims, 8 Drawing Sheets

(51) Int. Cl.
*G01N 33/48* (2006.01)
*G01N 1/10* (2006.01)
*G01N 1/22* (2006.01)
G01N 27/447 (2006.01)
G01N 30/80 (2006.01)
B01L 3/02 (2006.01)

(52) U.S. Cl.
CPC .......... *B01L 2200/0652* (2013.01); *B01L 2300/0809* (2013.01); *B01L 2300/0816* (2013.01); *B01L 2300/0864* (2013.01); *B01L 2400/0421* (2013.01); *B01L 2400/0442* (2013.01); *G01N 27/44739* (2013.01); *G01N 30/80* (2013.01)

(56) References Cited

U.S. PATENT DOCUMENTS

| | | |
|---|---|---|
| 8,067,159 B2 | 11/2011 | Brown et al. |
| 8,454,906 B2 | 6/2013 | Mathies et al. |
| 8,926,817 B2 | 1/2015 | Witkowski et al. |
| 2002/0033193 A1 | 3/2002 | McNeely et al. |
| 2011/0061863 A1 | 3/2011 | Ramakrishnan et al. |
| 2012/0201725 A1 | 8/2012 | Imran |
| 2014/0118435 A1 | 5/2014 | Van Brocklin et al. |
| 2016/0334323 A1* | 11/2016 | McGuinness .......... G01N 15/12 |
| 2018/0056288 A1* | 3/2018 | Abate ................ G01N 15/1459 |

FOREIGN PATENT DOCUMENTS

| | | |
|---|---|---|
| CN | 103702836 | 4/2014 |
| WO | WO-2004025266 | 3/2004 |
| WO | WO-2014138475 A1 | 9/2014 |
| WO | WO-2014178827 | 11/2014 |

OTHER PUBLICATIONS

PCT International Search Report and Written Opinion, dated Jan. 29, 2016, PCT Application No. PCT/US2015/028662, Korean Intellectual Property Office, 15 pages.

Stefan Haeberle et al.; Microfluidic Platforms for Lab-on-a-chip Applications; Lab on a Chip—RSC Publishing; Jul. 27, 2007; pp. 1-25.

* cited by examiner

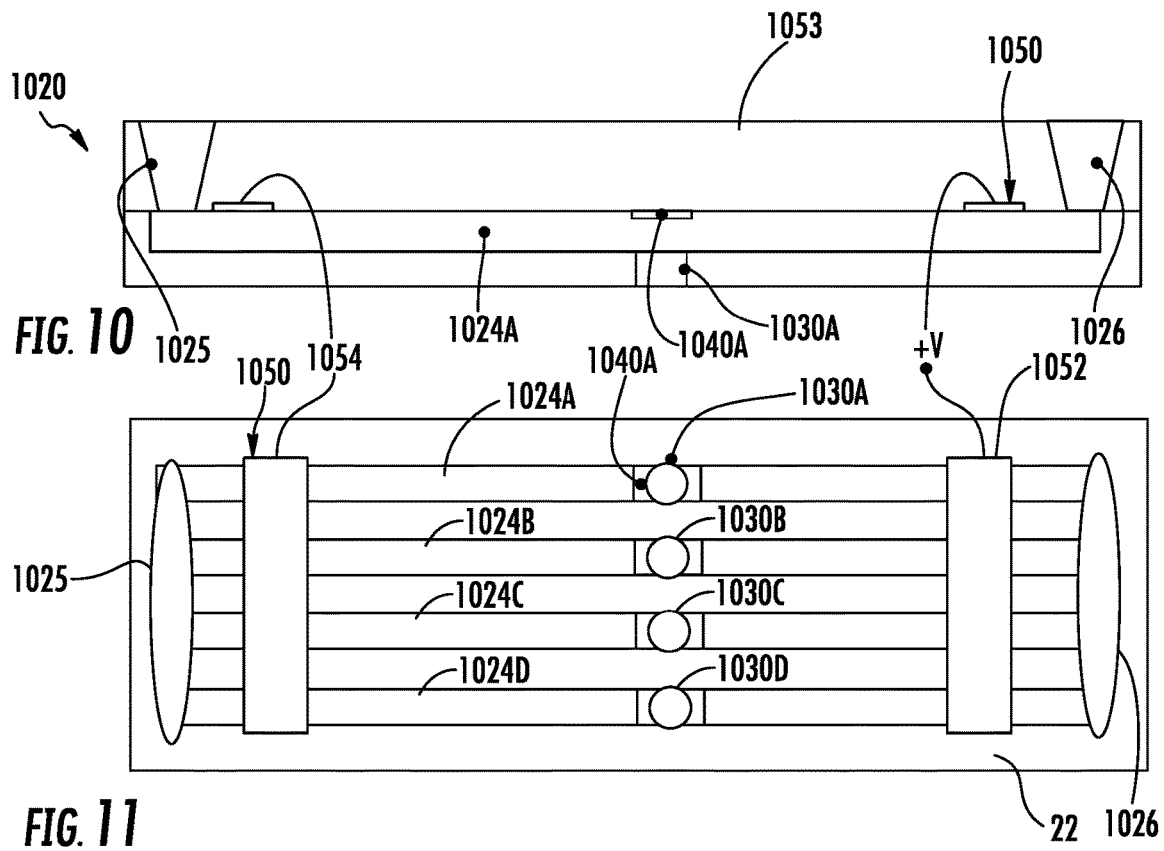
FIG. 10
FIG. 11
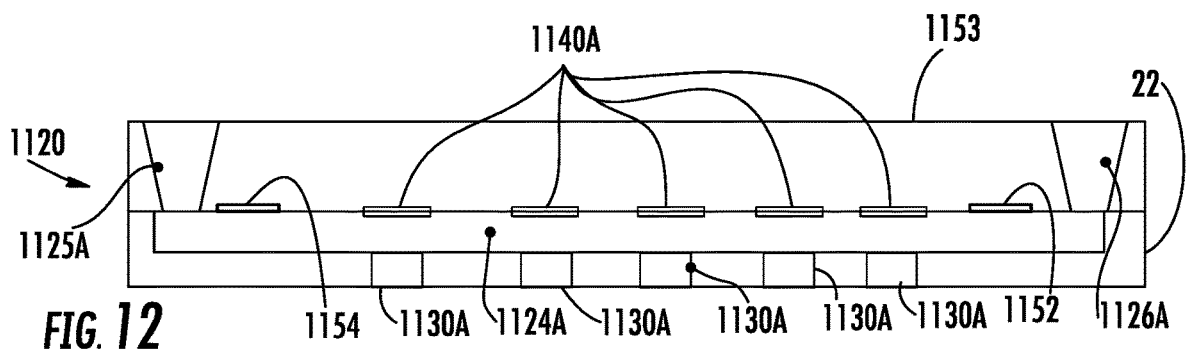
FIG. 12
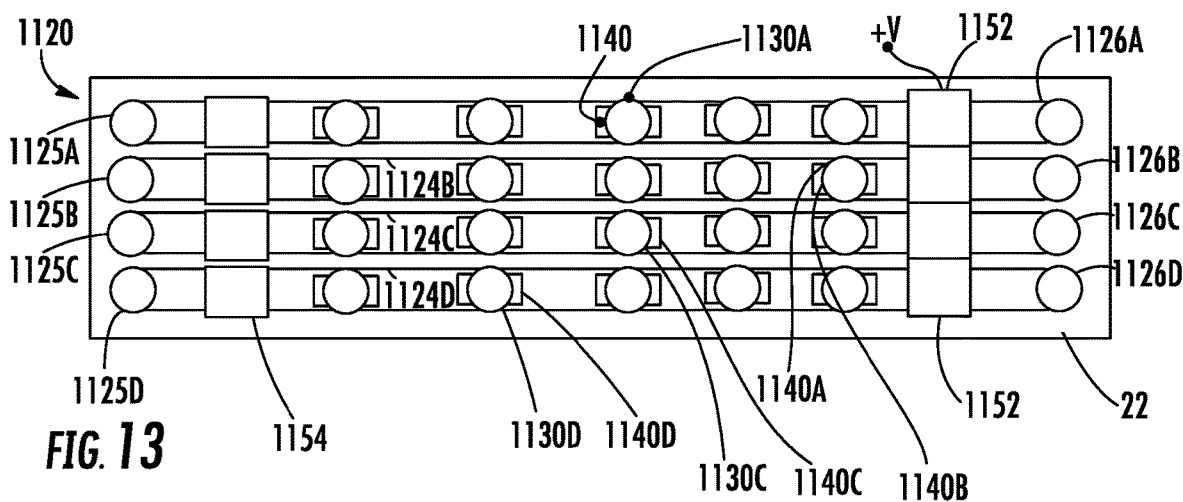
FIG. 13

TARGET CONSTITUENT LOCATION AND DISCHARGE

BACKGROUND

Fluid samples comprising complex mixtures are sometimes separated into fractions for analysis. The separated fractions may include unique species of small or large organic, inorganic, volatile or nonvolatile constituents. Separation and recovery of the un-diluted separated constituents poses a great challenge.

BRIEF DESCRIPTION OF THE DRAWINGS

FIG. 10 is a sectional view of another example target constituent location and discharge system.

FIG. 11 is a top view of the system of FIG. 10.

FIG. 12 is a sectional view of another example target constituent location and discharge system.

FIG. 13 is a top view of the system of FIG. 12.

DETAILED DESCRIPTION OF EXAMPLES

Figure 1:
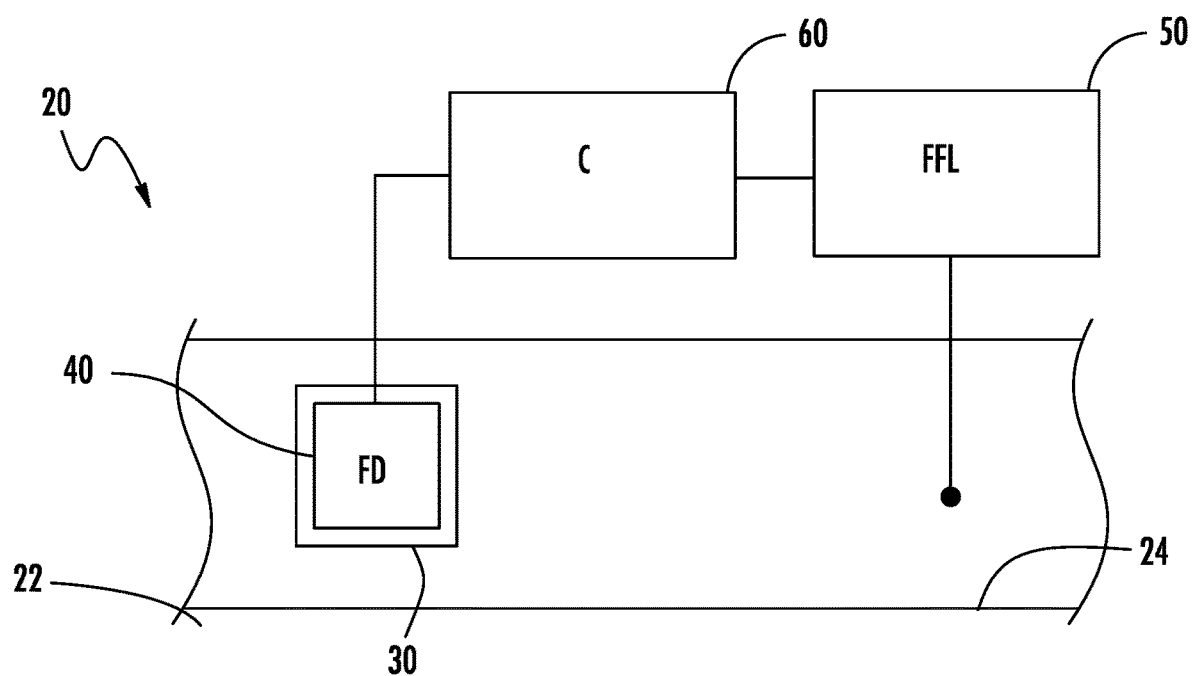
FIG. 1 is a schematic diagram of an example target constituent location and discharge system.

FIG. 1 schematically illustrates an example target constituent location and discharge system 20. System 20 identifies fractions of fluid within a microfluidic channel having a target constituent and selectively discharges the identified fractions with the target constituent through an exit passage from the microfluidic channel. System 20 comprises a substrate 22, microfluidic channel 24, fluid exit passage 30, fluid displacement device 40, constituent locator 50 and controller 60.

Substrate 22 comprises a chip, wafer, platform or other structure upon which or in which at least one component of system 20 is supported. In one implementation, substrate 22 is part of a chip, severed from a wafer. In one implementation, substrate 22 serves as a mechanical support for circuits. In one implementation, substrate 22 comprises a monocrystalline silicon, portions of which are selectively doped to form circuits or components of substrate 22. In yet other implementations, substrate 22 may be formed from other materials.

Microfluidic channel 24 comprises a passage formed within or upon a substrate 26. Microfluidic channel 24 has a width and height, each of which is in the sub-millimeter scale. In one implementation, microfluidic channel 24 has a width and height, each having a dimension of between 5 and 200 µm and nominally between 5 and 50 µm. Although illustrated as being linear, microfluidic channel 24 may have a curved, serpentine, branched or other shape.

Fluid exit passage 30 comprises a passage extending from channel 24 through which fluid within channel 24 may be discharged or moved. In one implementation, fluid exit passage 30 comprises an opening or nozzle through which a droplet of fluid is expelled or multiple droplets of fluid are expelled from channel 24 into a reservoir or reservoir array or onto an analysis substrate. One example of an analysis substrate is a nano wire surface of a surface-enhanced Raman spectroscopy (SERS) substrate. In one implementation, the nozzle is shaped to match or correspond to the expected shape of the fraction of fluid to be ejected. For example, in one implementation, the nozzle may have a square or rectangular shape.

In yet another implementation, fluid exit passage 30 comprises a port or opening leading to a branch portion of microfluidic channel 24 which may lead to other fluid exit passages, or other fluid interaction components such as mixers that mix fluid, sensors that sense characteristics of the fluid or dispensers that dispense additional fluid or analyte into the fluid. In such an implementation, the dimensions of the fluid exit passage may be sized thus to correspond to the expected dimension or size (and shape) of the fraction of fluid to be discharged into the branching portion of the microfluidic channel 24.

Fluid displacement device 40 comprises the device to exert a force upon fluid to influence movement of and displace the fluid. In implementations where fluid exit passage 30 comprises an opening or nozzle for the expulsion of a droplet or droplets of fluid, fluid displacement device 40 may be positioned opposite to the opening or nozzle, serving as fluid exit passage 30, to expel the droplet or droplets through the discharge opening. In implementations where fluid exit passage 30 comprises a branching portion of microfluidic channel 24, fluid displacement device 40 may be located within the branching portion proximate to the fluid exit passage 30 at a location relative to the adjacent fluid reservoir or channel geometries such that fluid displacement device 40 forms an inertial pump to move fluid into the branching portion of microfluidic channel 24. For purposes of this disclosure, the term "inertial pump" refers to a pumping device that initially drives fluid in both directions within a channel that is relatively narrow towards the destination it connects, but wherein the pumping device is asymmetrically positioned between the origin and destination such that the end result is fluid being driven in a direction towards the most distant fluid volume, the fluid destination.

In one implementation, fluid displacement device comprises a thermal inkjet resistor which is to be heated, through the supply of electric current across the resistor, to a temperature sufficient to vaporize adjacent fluid to create an air bubble which outwardly displaces surrounding fluid and wherein collapse of the air bubble creates a void of negative pressure which draws in adjacent fluid. In such implementations where fluid displacement device 40 comprises a thermal inkjet resistor, microfluidic channel 24 may be provided with reduced dimensions and may be more closely located to adjacent microfluidic channels due to the small form factor of a thermal inkjet resistor. In such implementations where fluid displacement device 40 comprises a thermal inkjet resistor, manufacturing of system 20 may be simplified as the thermal inkjet resistor serving as a fluid dispensing device 40 may be fabricated alongside or concurrently with other components using semiconductor fabrication processes such as complementary metal-oxide semiconductor (CMOS) fabrication technologies. In such implementations, fluid displacement device 40 is integrated as part of the chip or substrate 22 and microfluidic channel 24. For purposes of this disclosure, the term "integrated" with respect to a chip, substrate or microfluidic channel means that a device or component is integral with the chip or substrate, or substrate or that the device or component is built into or as part of the chip, or substrate in that structures of the device or component are formed or fabricated upon the chip or substrate, such that they cannot be readily separated without cutting or severing portions of the chip or substrate. Because fluid displacement device 40 is integrated with microfluidic channel 24 on substrate 26, a separate connection of a pump, drop ejector or other fluid displacement device to microfluidic channel 24 may be avoided.

In implementations where fluid exit passage 30 comprises a nozzle, the thermal inkjet resistor cooperates with the fluid exit passage 30 to form a drop ejector. In implementations where fluid exit passage 30 comprises a branching portion of channel 24, the thermal inkjet resistor is located within or adjacent the branching portion, asymmetrically located between source and destination volumes, to form a bubble jet inertial pump to selectively move or drive fluid into the branching portion of microfluidic channel 24.

In addition to facilitating a small form factor and integration, the thermal inkjet resistor forming fluid displacement device 40 facilitates the displacement of nanoliter and picoliter quantities of fluid. For example, in one implementation, fluid displacement device 40 may comprise a thermal inkjet resistor to displace individual droplets or individual volumes of liquid less than 50 nanoliters and may support volumes in the picoliter range.

In yet other implementations, fluid displacement device 40 may comprise other devices that apply force to fluid to displace fluid. For example, in other implementations, fluid displacement device 40 may comprise a piezo resistive displacement device, wherein the application of electric current to the electrically resistive material causes the material to change shape so as to move a diaphragm to displace fluid. In implementations where fluid exit passage 30 comprises a nozzle, the piezo resistive displacement device cooperates with the fluid exit passage 30 to form a drop ejector. In implementations where fluid exit passage 30 comprises a branching portion of channel 24, the piezo resistive displacement device is located within or adjacent the branching portion, asymmetrically located between source and destination volumes, to form an inertial pump to selectively move or drive fluid into the branching portion of microfluidic channel 24. In yet other implementations, fluid displacement device 40 may comprise other fluid displacement pumps.

Constituent locator 50 comprises a device (encompassing a group of devices) that (1) identifies or distinguishes target constituents in the fluid within microfluidic channel 24 from remaining non-target constituents and (2) locates and/or positions a target fraction of the fluid containing the target constituents proximate fluid exit passage 30 along microfluidic channel 24. For purposes of this disclosure, the term "locate", with reference to the target constituents or a target fluid fraction, shall mean: (a) identifying the location of a target constituent or target fraction and/or (b) moving and positioning a target constituent or target fraction. Target constituents comprise elements within the fluid that are of interest. Example of target constituents include, but are not limited to, cells, molecules and particles. Such constituents may be organic or inorganic, volatile or nonvolatile. Further examples of constituents include, but are not limited to, DNA, RNA, proteins, peptides, drugs, vitamins and hormones. Fluid fractions comprise different portions of the fluid stream or fluid volume, such as end to end bands of fluid entrained within microfluidic channel 24, wherein such bands have a cross-sectional shape corresponding to the internal cross-sectional shape of microfluidic channel 24.

Fluid fractions may contain multiple different constituents, wherein some fluid fractions have different concentrations of each of the different constituents or which contain or carry different concentrations of particular constituents having particular characteristics. For example, one fluid fraction may contain a greater concentration or a greater count of a first type of constituent while another fluid fraction contains a greater concentration are greater count of a second different type of constituent. One fluid fraction may contain a greater concentration or a greater count of a constituent of a particular size or ranges of sizes or a particular health (as in the case of cells) as compared to the same type of constituents contained in a different fluid fraction.

In one implementation, constituent locator 50 comprises a microfluidic sensor or multiple microfluidic sensors along channel 24 that detect and/or identify constituents in the fluid within channel 24. For example, in one implementation, constituent locator may comprise an impedance sensor. In another implementation, constituent locator may comprise an optical sensor or photo sensor. In still other implementations, constituent locator may utilize other types of sensors capable of detecting particular constituents or constituent characteristics entrained within the fluid within microfluidic channel 24.

Constituent locator 50 locates a target fraction of the fluid containing the target constituent proximate to fluid exit passage 30. In one implementation, constituent locator 50 comprises a microfluidic sensor proximate to fluid exit passage 30 to detect when the target fraction contain the target constituent has moved or flowed to a location within microfluidic channel 24 such that the target fraction may be discharged through fluid exit passage 30. In another implementation, constituent locator 50 comprise a microfluidic sensor upstream a fluid exit passage 30, wherein once the target fraction containing the target constituents has been identified by the upstream sensor, the movement of the target fraction along microfluidic channel 24 is tracked either through additional downstream microfluidic sensors and/or based upon a determined or obtained rate at which the fluid, including the target fluid fraction, is moving along microfluidic channel 24 towards fluid exit passage 30.

In one implementation, constituent locator 50 comprises a constituent separator that interacts with the fluid within microfluidic channel 24 to separate constituents in the fluid so as to positively promulgate different fractions with different concentrations of different constituents, whether the different constituents in the different fractions be different types of constituents or whether the different constituents in the different fractions be the same type of constituents but with different characteristics. In one implementation, constituent locator 50 comprise a constituent separator that utilizes electrophoresis, capillary zone electrophoresis, capillary gel electrophoresis, isotachophoresis, high pressure liquid chromatography, electro chromatography, liquid-liquid extraction, fractional distillation, filtration or the like. In some implementations, the constituent separator forms fluid fractions that comprise bands of concentrated constituents having a prearranged order along microfluidic channel 24. In such implementations, the prearranged order of bands or fluid fractions having different constituents (whether of a different type or the same type but with different characteristics) results in the particular target fraction being automatically located proximate to fluid ejection passage 30 for discharge by fluid dispensing device 40. In such implementations where the constituent separator consistently locates the prearranged order of different fluid fractions, having different constituent types or characteristics, along microfluidic channel 24, the aforementioned microfluidic sensors to identify the target fraction containing the target constituent or to track movement of the target fraction along microfluidic channel 24 may be omitted.

Controller 60 comprises electronics, such as electronics comprising a processing unit that output control signals to control fluid displacement device 40 and constituent locator 50. For purposes of this disclosure, the term "processing unit" shall mean a presently developed or future developed processing unit comprising hardware that executes sequences of instructions contained in a non-transitory computer-readable medium or memory, such as memory 56. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other implementations, hard wired circuitry may be used in place of or in combination with software instructions to implement the functions described. For example, controller 60 may be provided as part of at least one application-specific integrated circuits (ASICs). Unless otherwise specifically noted, the controller is not limited to any specific combination of hardware circuitry and software, nor to any particular source for the instructions executed by the processing unit.

Figure 2:
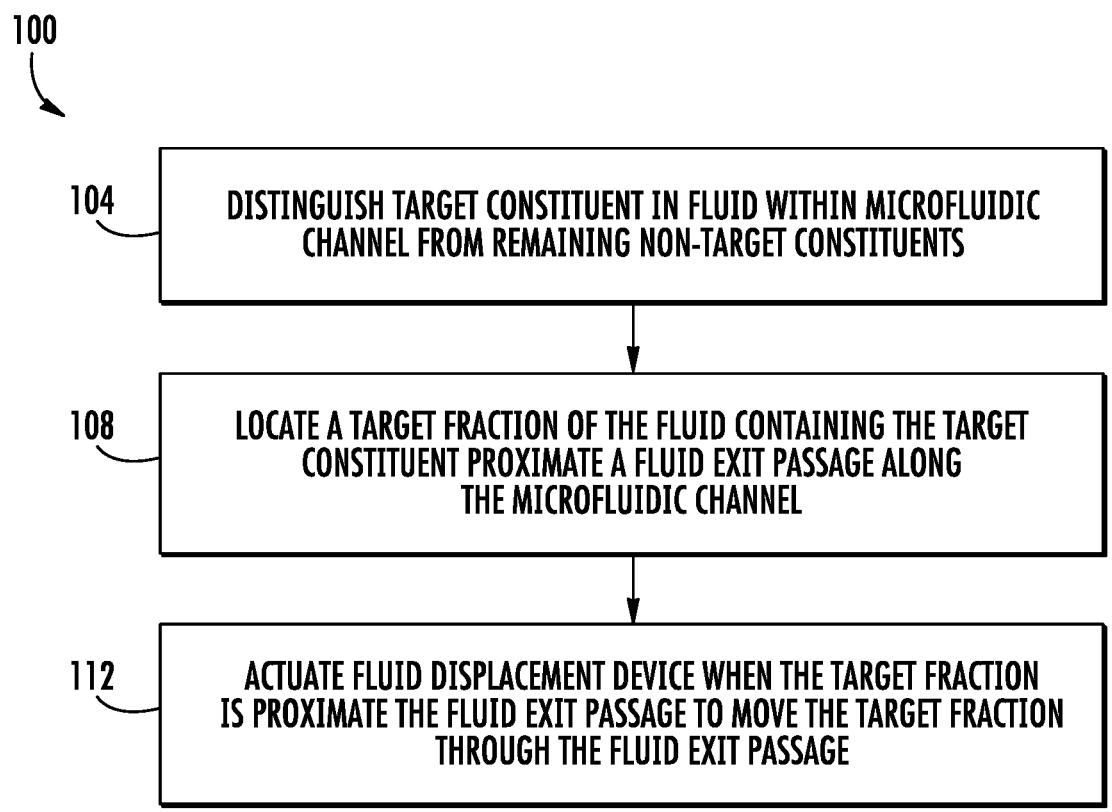
FIG. 2 is a flow diagram of an example method for locating and discharging fluid fractions.

In the example illustrated, controller 60, following instructions contained in a non-transitory computer-readable medium, controls the operation of system 20 to carry out method 100 outlined in FIG. 2. As indicated by blocks 104 and 108 and FIG. 2, controller 60 outputs control signals causing constituent locator 50 to (1) distinguish target constituent from remaining non-target constituents in the fluid within microfluidic channel 24 and (2) locate a target fraction of the fluid that contains the target constituent proximate to fluid exit passage 30 along microfluidic channel 24. In one implementation, the two noted functions are carried out by separate devices. For example, in one implementation, constituent locator 50 may comprise a microfluidic sensor that senses fluid to identify a target constituent in the fluid or to identify a particular target fraction of the fluid that contain a satisfactory concentration of the target constituent. In such an implementation, constituent locator 50 may utilize a microfluidic pump (and possibly microfluidic valves) to then move and direct the target fraction, identified as containing the target constituent, so as to locate the target fraction proximate to fluid exit passage 30.

In implementations where constituent locator 50 comprise a constituent separator as described above, the constituent separator may automatically separate, and thereby automatically distinguish the target constituent and its target fraction from other fractions of the fluid containing non-target constituents. In such an implementation, controller 60 tracks movement of the separate constituents along microfluidic channel 24, based upon the obtained rate which fluid is pumped through microfluidic channel 24, until it is determined that the target fraction containing the target constituent is proximate to fluid exit passage 30. In some implementations, due to the specific location of the constituent separator along channel 24 relative to fluid exit passage 30, the constituent locator 50 may automatically and consistently position a target constituent at a predetermined position within microfluidic channel 24 such that the target constituent within its target fraction of the fluid is automatically located proximate to fluid exit passage 30.

As indicated by block 112, once the target fraction containing the target constituent is proximate to fluid exit passage 30 so as to be movable through passage 30, controller 60 outputs control signals actuating fluid displacement device 40 to move the target fraction through fluid exit passage 30. As noted above, in one implementation, fluid displacement device 40 may move the target fraction through a nozzle. In another implementation, fluid displacement device 40 may move the target fraction into a branch portion of microfluidic channel 24.

Figure 3:
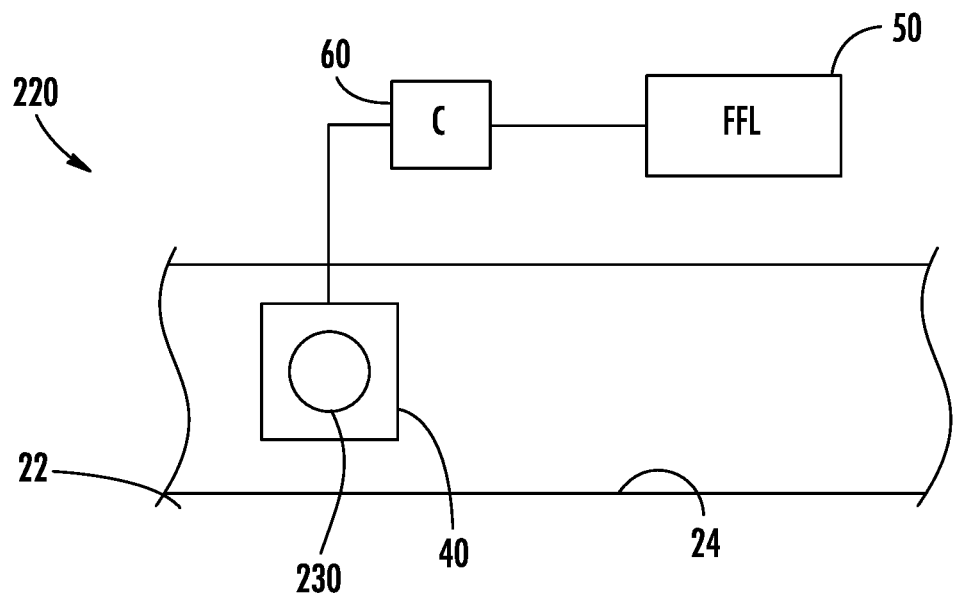
FIG. 3 is a schematic diagram of another example target constituent location and discharge system.

FIG. 3 schematically illustrates target constituent location and discharge system 220, another example of fluid fraction location discharge system 20 described above. As with system 20, system 220 identifies fractions of fluid within a microfluidic channel having a target constituent and selectively discharges the identified fractions through an exit passage from the microfluidic channel. System 220 is similar to system 20 except that system 220 is illustrated as specifically comprising fluid exit passage 230 in the form of a nozzle. Those remaining components of system 220 which correspond to components of system 20 are numbered similarly. In the illustrated example, fluid displacement device 40 ejects droplets of fluid through fluid exit passage 230. In one implementation, such droplets of fluid are ejected into a reservoir or other collection substrates for analysis.

Figure 4:
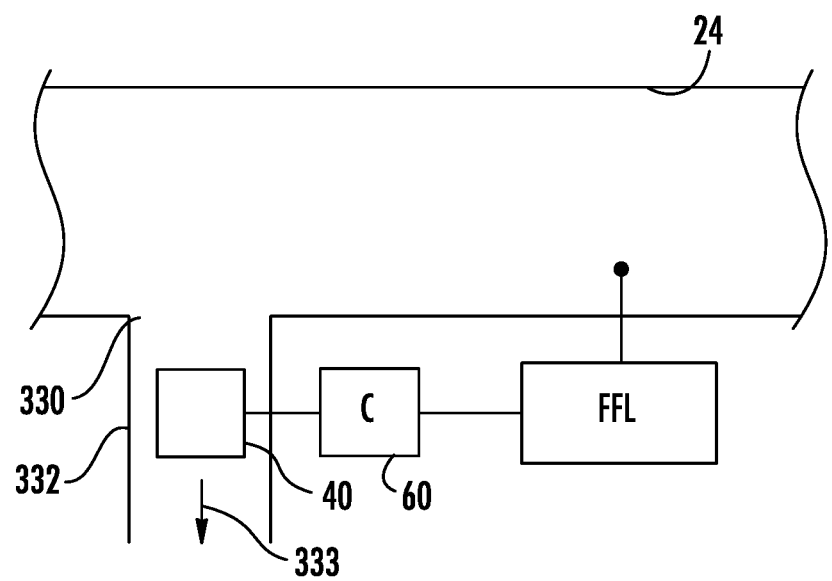
FIG. 4 is a schematic diagram of another example target constituent location and discharge system.

FIG. 4 schematically illustrates target constituent location and discharge system 320, another example of fluid fraction location discharge system 20 described above. As with system 20, system 320 identifies fractions of fluid within a microfluidic channel having a target constituent and selectively discharges the identified fractions through an exit passage from the microfluidic channel. System 320 is similar to system 20 except that system 320 is illustrated as specifically comprising fluid exit passage 330 in the form of port or passage leading to a branch portion 332 of microfluidic channel 24 and wherein fluid displacement device 40 selectively drives a fluid fraction into the branch portion 332. Those remaining components of system 320 which correspond to components of system 20 are numbered similarly. In the illustrated example, fluid displacement device 40 comprises an inertial pump, such as a bubble jet inertial pump, within branch portion 332 and asymmetrically located so as to drive or pump fluid into branch portion 332 and along branch portion 332 in the direction indicated by arrow 333. Branch portion 332 of microfluidic channel 24 which may lead to other fluid exit passages, or other fluid interaction components such as mixers that mix fluid, sensors that sense characteristics of the fluid or dispensers that dispense additional fluid or analyte into the fluid. In such an implementation, the dimensions of the fluid exit passage may be sized thus to correspond to the expected dimension or size (and shape) of the fraction of fluid to be discharged into the branching portion of the microfluidic channel 24.

Figure 5:
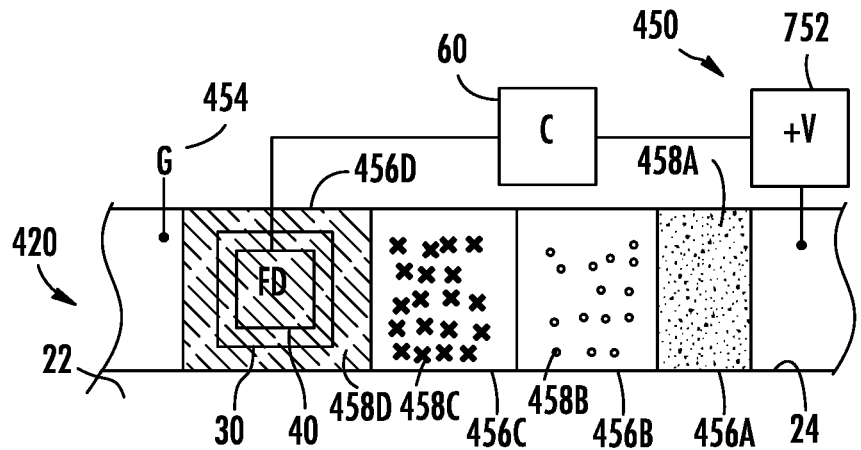
FIG. 5 is a schematic diagram of another example target constituent location and discharge system.

FIG. 5 schematically illustrates target constituent location and discharge system 420, another example of fluid fraction location discharge system 20 described above. As with system 20, system 420 identifies fractions of fluid within a microfluidic channel having a target constituent and selectively discharges the identified fractions through an exit passage from the microfluidic channel. System 420 is similar to system 20 except that system 420 is illustrated as specifically comprising constituent locator 450 in the form of a constituent separator. Those remaining components of system 420 which correspond to components of system 20 are numbered similarly.

Constituent locator 450 interacts with the fluid within microfluidic channel 24 to separate constituents in the fluid so as to positively promulgate different fractions with different concentrations of different constituents, whether the different constituents in the different fractions be different types of constituents or whether the different constituents in the different fractions be the same type of constituents but with different characteristics. In the example illustrated, constituent locator 450 comprises a constituent separator that utilizes electrophoresis. Electrophoresis results in motion of dispersed particles or constituents relative to the fluid under the influence of a spatially uniform electric field. In the example illustrated, constituent locator 450 applies electric field to fluid within microfluidic channel 24 using a charged electrode 452 and a ground 454.

Upon being actuated by controller 60, electrode 452 cooperates with ground 454 to create an electric field across the fluid entrained within microfluidic channel 24 between elected 452 and ground 454. As schematically illustrated in FIG. 5, the applied electric field causes different constituents entrained in the fluid to move or migrate within the fluid based on their differing characteristics so as to separate from one another and form bands 456A, 456B, 456C and 456D (collectively referred to as bands 456) along microfluidic channel 24 between electrode 452 and ground 454. Each of bands 456 contains a particular concentration of a constituent. Each of bands 456 contains a higher concentration of a particular type or characteristic of constituent that is different from the remaining bands 456 due to the different properties of the different constituents that separate from one another. In the example illustrated, band 456A has a higher concentration of constituent 458A, band 456B has a higher concentration of constituent 4586, band 458C has a higher concentration of constituent 458C and band 456D is a higher concentration of constituent 458D.

In one implementation, the order of bands and the particular constituents of higher concentration within each of such bands 456 is naturally ordered due to the different properties of the different constituents 458. In other implementations, locator 452 may provide constituent separation through the use of other technologies such as capillary zone electrophoresis, capillary gel electrophoresis, isotachophoresis, high pressure liquid chromatography, electrochromatography, liquid-liquid extraction, fractional distillation, filtration and the like.

As schematically illustrated by FIG. 5, the formation of bands 456 (and their corresponding fluid fractions) by constituent separation, such as electrophoresis, may result in such bands having a predefined or predetermined relative location to one another and relative location with respect to fluid exit passage 30. As a result, if the target constituent is constituent 458D, upon completion of electrophoretic separation, controller 60 outputs control signals actuating fluid displacement device 40 to move the target fraction corresponding to band 456C containing type constituent 458D through fluid exit passage 30, whether it be a nozzle or to a branch channel.

To selectively move a different constituent through fluid exit passage 30, controller 60 times the output of its control signals and the actuation of fluid displacement device 40 based upon the predetermined or calculated position of the target constituent after completion of electrophoretic separation and the obtained or predetermined rate at which fluid is being pumped or moved through microfluidic channel 24, to move the target constituent through fluid exit passage 30. For example, if system 420 is to additionally or alternatively move target constituent 458, upstream of fluid exit passage 30, through fluid exit passage 30, controller 60, upon completion of a electrophoretic separation, determines the present location of band 456A and when band 456A will have moved downstream so as to be located adjacent or otherwise proximate to fluid exit passage 30. Upon band 456A reaching fluid exit passage 30, controller 60 actuate fluid displacement device 40 to move band 456A through fluid exit passage 30.

Figure 6:
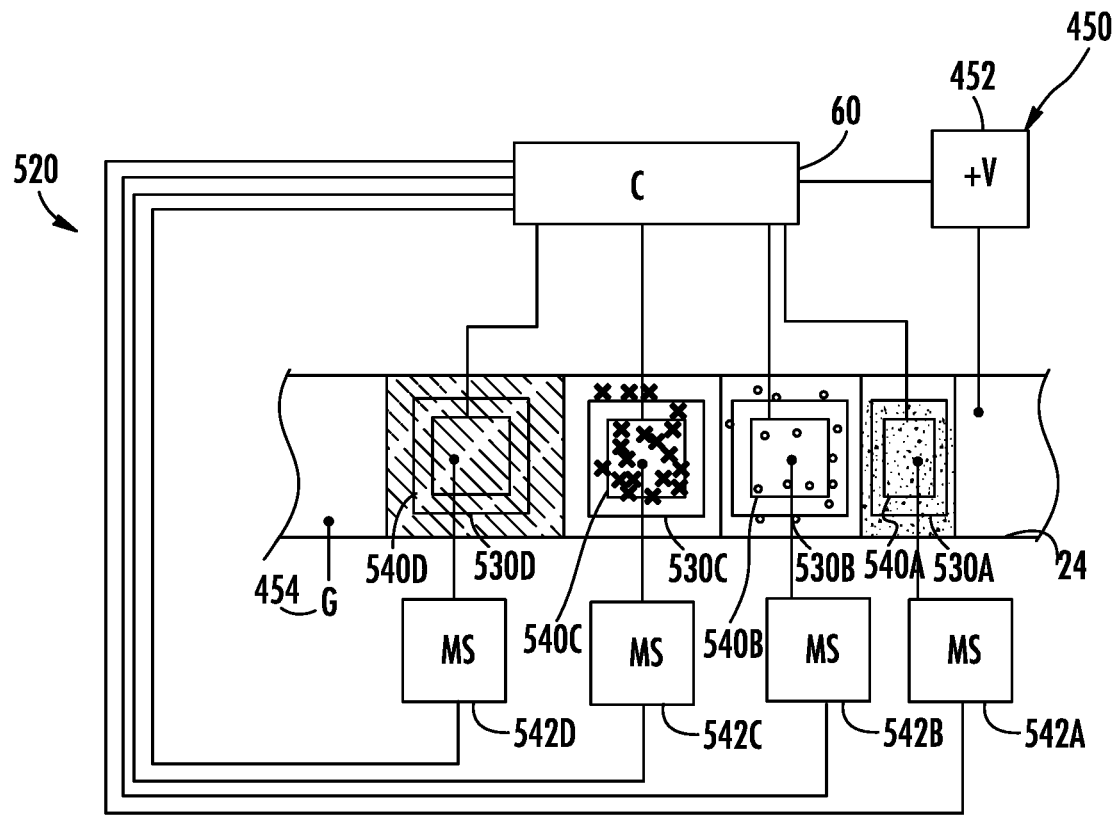
FIG. 6 is a schematic diagram of another example target constituent location and discharge system.

FIG. 6 schematically illustrates target constituent location and discharge system 520, another example of fluid fraction location discharge system 20 described above. As with system 20, system 420 identifies fractions of fluid within a microfluidic channel having a target constituent and selectively discharges the identified fractions through an exit passage from the microfluidic channel. System 520 is similar to system 420 except that system 520 comprises a plurality of spaced fluid exit passages 530A, 530B, 530C, 530D (collectively referred to as exit passages 530), a plurality of fluid displacement devices 540A, 540B, 540C, 540D (collectively referred to as displacement devices 540) and a plurality of microfluidic sensors 542A, 542B, 542C and 542D (collectively referred to as microfluidic sensors 542). Those remaining components of the system 520 which correspond to components of system 420 are numbered similarly.

Fluid exit passages 530 are spaced from one another along channel 24 between electrode 452 and ground 454. Each of fluid exit passages 530 is similar to fluid exit passage 30 described above. In one implementation, each of fluid exit passages 530 comprises a nozzle through which droplets of fluid are ejected. In another implementation, each of fluid exit passages 530 comprises a port leading to a branched portion of channel 24. In yet another implementation, some of fluid exit passages 530 comprise nozzles while others of fluid exit passes 530 comprise ports leading to branched portions of channel 24.

In one implementation, the shape or size of each fluid exit passage 530 is provided based upon the characteristics of the constituents to move through the exit passage and/or the characteristics of the corresponding band 456 containing the constituents and resulting from the constituent separation. In the example illustrated, fluid exit passage 530A is differently sized as compared to fluid exit passages 530B-530D. In one implementation, fluid exit passage 530A is smaller than the remaining fluid exit passages 530. As a result, the smaller cross-sectional area of the opening of fluid exit passage 530A serves as a filter, blocking or preventing larger constituents from passing through fluid exit passage 530A. In one implementation, fluid exit passage 530 has a shape that corresponds to the shape of the band to move through the fluid exit passage. For example, in one implementation where the bands are expected to be square rectangular, the fluid exit passages 530 may comprise a square or rectangular nozzle or a square or rectangular port.

In the example illustrated, the fluid exit passages 530 are spaced from one by distances or at locations based upon the anticipated relative locations of band 456. For example, in one implementation, each of fluid exit passages 530 has a center that is located along channel 24 so as to be centered or otherwise aligned with respect to the corresponding band 456 resulting from the constituent separation provided by constituent locator 450. Although system 520 is illustrated as comprising a fluid exit passage 530 for each of the different bands 456 produced by locator 450, in other implementations, system 520 may comprise a number of fluid exit passes 530 larger or smaller than the number of bands produced by locator 452. In one implementation, system 520 comprises a number of spaced fluid exit passages 530, wherein depending upon properties of the particular fluid within channel 24 and/or depending upon the operation of locator 450 (the electric field created by locator 450), not all of the fluid exit passages 530 are utilized. In such an implementation, the larger number of fluid exit passages 530 provide system 520 with greater flexibility, the capability to more efficiently cooperate with multiple types of fluids having different types of constituents.

Fluid displacement devices 540 located between ground 454 and electric 452 and are located so as to correspond to fluid exit passages 530. Each of fluid displacement devices 540 is similar to fluid displacement device 40 described above. In one implementation, each of such fluid displacement devices 540 comprises a thermal inkjet resister which cooperates with the corresponding fluid exit passage 530 to form a drop on demand ejection device or a bubble jet inertial pump.

Microfluidic sensors 542 are situated along microfluidic channel 24 between ground 454 and electrode 452. Microfluidic sensors 542 are spaced so as to correspond to fluid exit passages 530. Microfluidic sensors 542 sense or detect characteristics of the particular fluid fraction and its constituents proximate to the corresponding fluid exit passage 530. Signals from such sensors 542 are transmitted to controller 60 to acquire additional information regarding the fluid fraction presently proximate to the corresponding fluid exit passage 530 or to confirm the completion of the separation by locator 452.

In one implementation, microfluidic sensors 542 each comprises an impedance sensor. In another implementation, microfluidic sensors 542 each comprises a photodetector optical detector. In yet other implementations, microfluidic sensors 542 comprise other types of presently known or future developed microfluidic sensors. In one implementation, microfluidic sensors 542 may be of different types or have different capabilities relative to one another. For example, microfluidic sensor 542A may be of a type or have capabilities more suited for the detection of characteristics associated with constituents 458A as compared to the other sensors 542. Each of the other sensors 542 may be similarly customized based upon the anticipated characteristics or types of constituents that will be positioned across such sensors 542 upon completion of constituent separation by locator 542. In some implementations, sensors 542 are omitted for some or all of fluid exit passages 30.

In operation, controller 60 output control signals causing locator 452 to carry out constituent separation. In the example illustrated, controller 60 output control signals causing ground electrode 454 and active electrode 452 to separate constituents by electrophoresis. As a result, bands 456 having constituents 458 are formed proximate to each of fluid exit passages 530.

Upon completion of such separation, controller 60 further obtains signals from sensors 542 confirming completion of the separation as well as providing data regarding each of the bands 456. Upon receiving data from sensors 542, controller 60 output control signals causing fluid displacement devices 540 to move the corresponding band 456 through their corresponding fluid exit passages 530. In one implementation, this process carried out while fluid is static within microfluidic channel 24. In another implementation, the constituent separation is carried out upstream of fluid exit passages 530, wherein the controller 60 actuates fluid displacement devices 540 at a predetermined time when the different bands 456 are proximate to the different fluid exit passages 530 based upon signals received from sensors 542 and/or based upon the location of the constituent separation and the obtained rate at which such bands 542 are being pumped or are otherwise flowing down channel 24 towards fluid exit passages 530.

Figure 7:
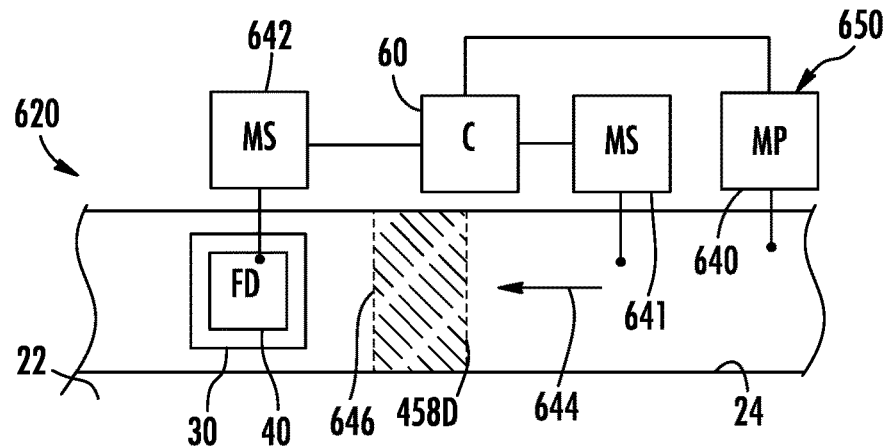
FIG. 7 is a schematic diagram of another example target constituent location and discharge system.

FIG. 7 schematically illustrates target constituent location and discharge system 620, another example of fluid fraction location discharge system 20 described above. As with system 20, system 620 identifies fractions of fluid within a microfluidic channel having a target constituent and selectively discharges the identified fractions through an exit passage from the microfluidic channel. System 620 is similar to system 20 except that system 620 is specifically illustrated as comprising constituent locator 650. Those remaining components of system 620 which correspond to components of system 20 are numbered similarly.

Constituent locator 650 comprises microfluidic pump 640, microfluidic sensors 641 and microfluidic sensor 642. Microfluidic pump 640 comprises a device that moves fluid within microfluidic channel 24. In one implementation, microfluidic pump 640 is integrated into the chip or substrate 22 forming microfluidic channel 24 and other portions of system 620. In one implementation, microfluidic pump 640 comprises an inertial pump. In one implementation, microfluidic pump comprises a bubble jet inertial pump. In some implementations, microfluidic pump 640 comprises a drop ejector, such as a thermal inkjet drop ejector, wherein ejection of the fluid creates fluid flow within microplate channel 24. In the example illustrated, pump 640 moves fluid through microfluidic channel 24 in the direction indicated by arrow 644.

Microfluidic sensors 641, 642 comprise devices that sensor detect characteristics of the fluid within microplate channel 24. In the example illustrated, sensor 641, 642 are integrated as part of substrate 22 with microfluidic channel 24. Microfluidic sensor 641 is located upstream a fluid exit passage 30. Microfluidic sensor 642 is located in close proximity with fluid exit passage 30. In one implementation, microfluidic sensors 641, 642 comprise impedance sensors. In another implementation, microfluidic sensor 641, 642 comprise photodetectors or optical sensors. In still other implementations, microfluidic sensor 641, 642 comprise other types of presently available or future developed microfluidic sensors. In one implementation, microfluidic sensors 641, 642 are of different types or have sensing capabilities, such as different sensing sensitivities. For example, in one implementation, sensor 641 may have a lower level of sensitivity to generally identify the presence of a target constituent and identify a target fraction containing the target constituent whereas microfluidic sensor 642 may have a greater level of sensitivity to more precisely determine when the target constituent has reached fluid exit passage 30.

In operation, as fluid is being pumped are driven along microfluidic channel 24 by microfluidic pump 640, under the direction of controller 60, microfluidic sensor 641 detects at least one characteristic or property of the fluid. Upon identifying a target constituent flowing as part of a fluid fraction along microfluidic channel 24, such as constituent 458D, sensor 641 provide signals to controller 60 indicating the identification of the target constituent and the fraction of fluid 646 containing the target constituent. Based upon the time at which the target fluid fraction 646 containing the target constituent 458D has passed and has been detected by microfluidic sensor 641 and the predetermined or sensed rate at which the fluid fraction 646 containing the target constituent 458D is being driven along channel 24 by pump 640, controller 60 estimates the time at which the target fluid fraction 646 containing target constituent 458D will reach fluid exit passage 30. As this time approaches, controller 60 actuates microfluidic sensor 642 to begin looking for the arrival of target fluid fraction 646 at fluid exit passage 30. In response to receiving signals from microfluidic sensor 642 indicating that the target fluid fraction 646 has arrived at fluid exit passage 30 or is just about to arrive at fluid exit passage 30, controller 60 outputs control signals actuating fluid displacement device 40 to move the target fraction through fluid exit passage 30. In some implementations, microfluidic sensor 642 may continuously be sensing fluid. In some implementations, either microfluidic sensor 641 or microfluidic sensor 642 may be omitted.

Figure 8:
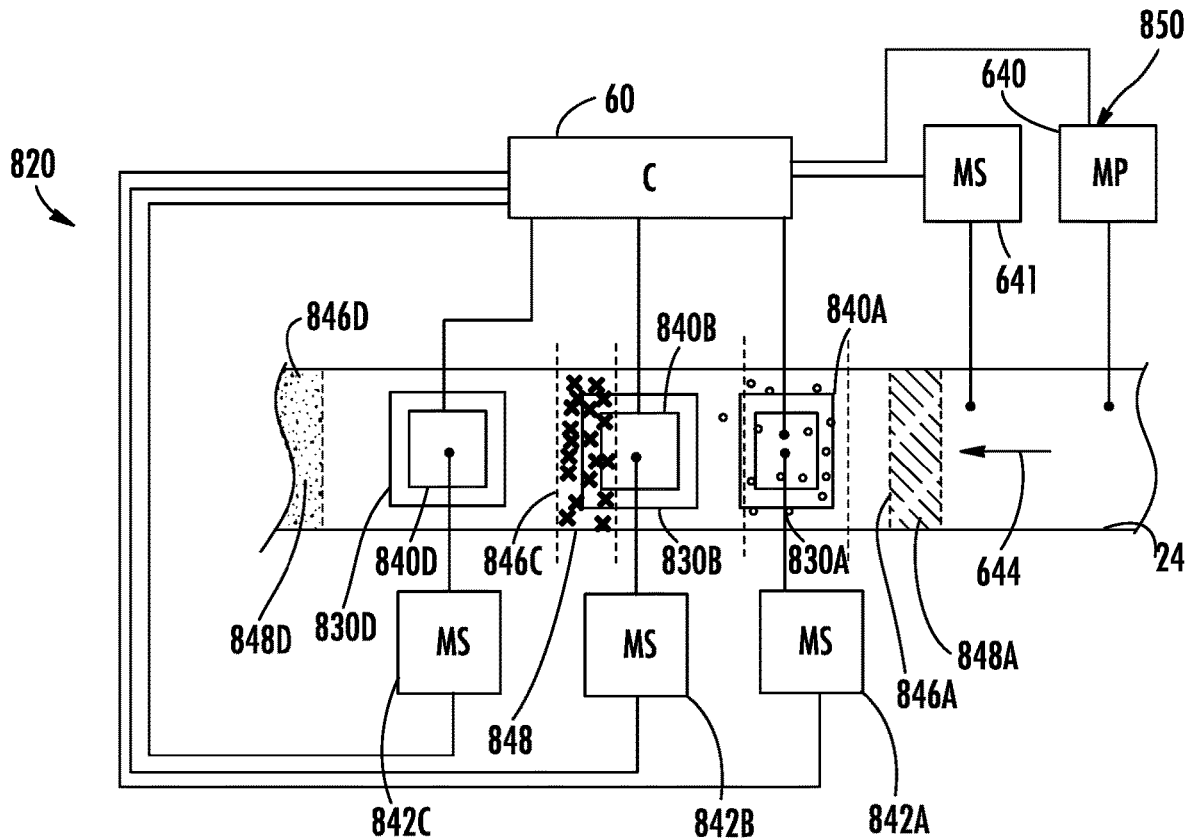
FIG. 8 is a schematic diagram of another example target constituent location and discharge system.

FIG. 8 schematically illustrates target constituent location and discharge system 820, another example of fluid fraction location discharge system 20 described above. As with system 20, system 820 identifies fractions of fluid within a microfluidic channel having a target constituent and selectively discharges the identified fractions through an exit passage from the microfluidic channel. System 820 is similar to system 620 except that system 820 comprises a plurality of spaced fluid exit passages 830A, 830B, 830C (collectively referred to as exit passages 830), a plurality of fluid displacement devices 840A, 840B, 840C (collectively referred to as displacement devices 840) and a constituent locator 850 that comprises microfluidic pump 640, microfluidic sensor 641 and microfluidic sensors 842A, 842B, 842C (collectively referred to as microfluidic sensors 842). Those remaining components of the system 820 which correspond to components of system 620 are numbered similarly.

Fluid exit passages 830 are spaced from one another along channel 24. Each of fluid exit passages 830 is similar to fluid exit passage 30 described above. In one implementation, each of fluid exit passages 830 comprises a nozzle through which droplets of fluid are ejected. In another implementation, each of fluid exit passages 830 comprises a port leading to a branched portion of channel 24. In yet another implementation, some of fluid exit passages 830 comprise nozzles while others of fluid exit passes 830 comprise ports leading to branched portions of channel 24.

In one implementation, the shape or size of each fluid exit passage 830 is provided based upon the characteristics of the constituents to move through the exit passage and/or the characteristics of the target fraction containing the constituents. In the example illustrated, fluid exit passage 830A is differently sized as compared to fluid exit passages 830B-530C. In one implementation, fluid exit passage 830A is smaller than the remaining fluid exit passages 830. As a result, the smaller cross-sectional area of the opening of fluid exit passage 830A serves as a filter, blocking or preventing larger constituents from passing through fluid exit passage 830A. In one implementation, fluid exit passage 830 have a shape that corresponds to the anticipated size of the target fraction to move through the fluid exit passage. In the example illustrated, the fluid exit passages 830 are spaced from one another along channel 24 based in part upon the rate which fluid is to remove through channel 24 by pump 640.

Fluid displacement devices 840 correspond to fluid exit passages 830. Each of fluid displacement devices 840 is similar to fluid displacement device 40 described above. In one implementation, each of such fluid displacement devices 840 comprises a thermal inkjet resister which cooperates with the corresponding fluid exit passage 830 to form a drop on demand ejection device or a bubble jet inertial pump.

Microfluidic sensors 842 are situated along microfluidic channel 24. Microfluidic sensors 842 are spaced so as to correspond to fluid exit passages 530. Microfluidic sensors 842 sense or detect characteristics of the particular fluid fraction and its constituents proximate to the corresponding fluid exit passage 830. Signals from such sensors 842 are transmitted to controller 60 to determine when a fluid fraction is proximate to the corresponding fluid exit passage 830 and to acquire additional information regarding the fluid fraction presently proximate to the corresponding fluid exit passage 830.

In one implementation, microfluidic sensors 842 each comprises an impedance sensor. In another implementation, microfluidic sensors 842 each comprises a photodetector optical detector. In yet other implementations, microfluidic sensors 842 comprise other types of presently known or future developed microfluidic sensors. In one implementation, microfluidic sensors 842 may be of different types or have different capabilities relative to one another. For example, microfluidic sensor 842A may be of a type or have capabilities more suited for the detection of characteristics associated with a first type of constituent or a constituent having particular characteristics as compared to the other sensors 842. Each of the other sensors 842 may be similarly customized based upon particular characteristics or types of constituents that will be detected for movement through the corresponding exit passage 830. In some implementations, sensors 542 are omitted for some or all of fluid exit passages 30. In some implementations, sensor 641 is omitted.

In operation, as fluid is being pumped are driven along microfluidic channel 24 by microfluidic pump 640, under the direction of controller 60, microfluidic sensor 641 detects different constituents in different fractions of the fluid flowing through channel 24. As each different target constituent is detected or sensed by sensor 641, sensor 641 provides signals to controller 60 indicating the identification of the target constituent and the particular fraction of fluid containing the target constituent. In the example illustrated in FIG. 8, the fluid flowing within channel 24 has four distinct fractions 846A, 846B, 846C and 846D (collectively referred to as fractions 846) having containing constituents 848A, 848B, 848C and 848D (collectively referred to as constituents 848), respectively. Sensor 641 indicates the presence and the timing at which those constituents 848 of interest have passed a sensing location of sensor 641 in channel 24.

Based upon the time at which the target fluid fraction 846 containing the target constituent 858 has passed and has been detected by microfluidic sensor 641 and the predetermined or sensed rate at which the fluid fraction 846 are being driven along channel 24 by pump 640, controller 60 tracks the movement of every fraction 846 of interest. By tracking the movement of every fraction 846 of interest as it moves along channel 24, controller 60 is able to select which of fluid exit passages 830 that the particular fraction 846 containing a particular target constituent 848 is moved. For example, in the example illustrated, target fraction 846D containing constituent 848D is not to be moved through any of the illustrated fluid exit passages 830, but is to continue on past each of such fluid exit passages 830 within channel 24.

In the example illustrated, fluid fraction 846 containing constituent 848C is to be moved through fluid exit passage 830C. As a result, controller 60 allows fraction 846C to flow past fluid exit passages 830A and 830B. Upon fraction 846C reaching fluid exit passage 830C, as determined by controller 60 based upon when fraction 846C was initially detected by sensor 641, based upon the rate at which the fluid is moving through channel 24 and/or based upon signals from sensor 841C, controller 60 outputs control signals causing fluid displacement device 840C to move the selected fluid fraction 846C through fluid exit passage 830C.

In the example illustrated, fluid fraction 846B containing constituent 848B is to be moved through fluid exit passage 830A. Fluid fraction 846A containing constituent 848A is to be moved through fluid exit passage 830B. As a result, upon fraction 846C reaching fluid exit passage 830C, as determined by controller 60 based upon when fraction 846C was initially detected by sensor 641 in combination with the rate at which the fluid is moving through channel 24 and/or based upon signals from sensor 841C, controller 60 outputs control signals causing fluid displacement device 840C to move the selected fluid fraction 846C through fluid exit passage 830C. Upon fraction 846A reaching fluid exit passage 830B, as determined by controller 60 based upon when fraction 846A was initially detected by sensor 641 in combination with the rate at which the fluid is moving through channel 24 and/or based upon signals from sensor 841B, controller 60 outputs control signals causing fluid displacement device 840B to move the selected fluid fraction 846A through fluid exit passage 830B. As a result, system 820 facilitates the selective channeling of distinct fractions of the fluid containing distinct constituents into any of the differently selected destinations through exit passages 830. In implementations where an exit passage 830 comprises a port to a branch portion of channel 824, the exit passage, in some implementations, may comprise a microfluidic valve which is selectively opened and/or closed depending upon the target destination for a particular fluid fraction. In other implementations, the momentum of the fluid or the incompatible size of the fluid exit passage may inhibit the fluid fraction or its constituents from inadvertently flowing into an unintended fluid exit passage. In some implementations, sensors 842 or sensor 641 may be omitted.

Figure 9:
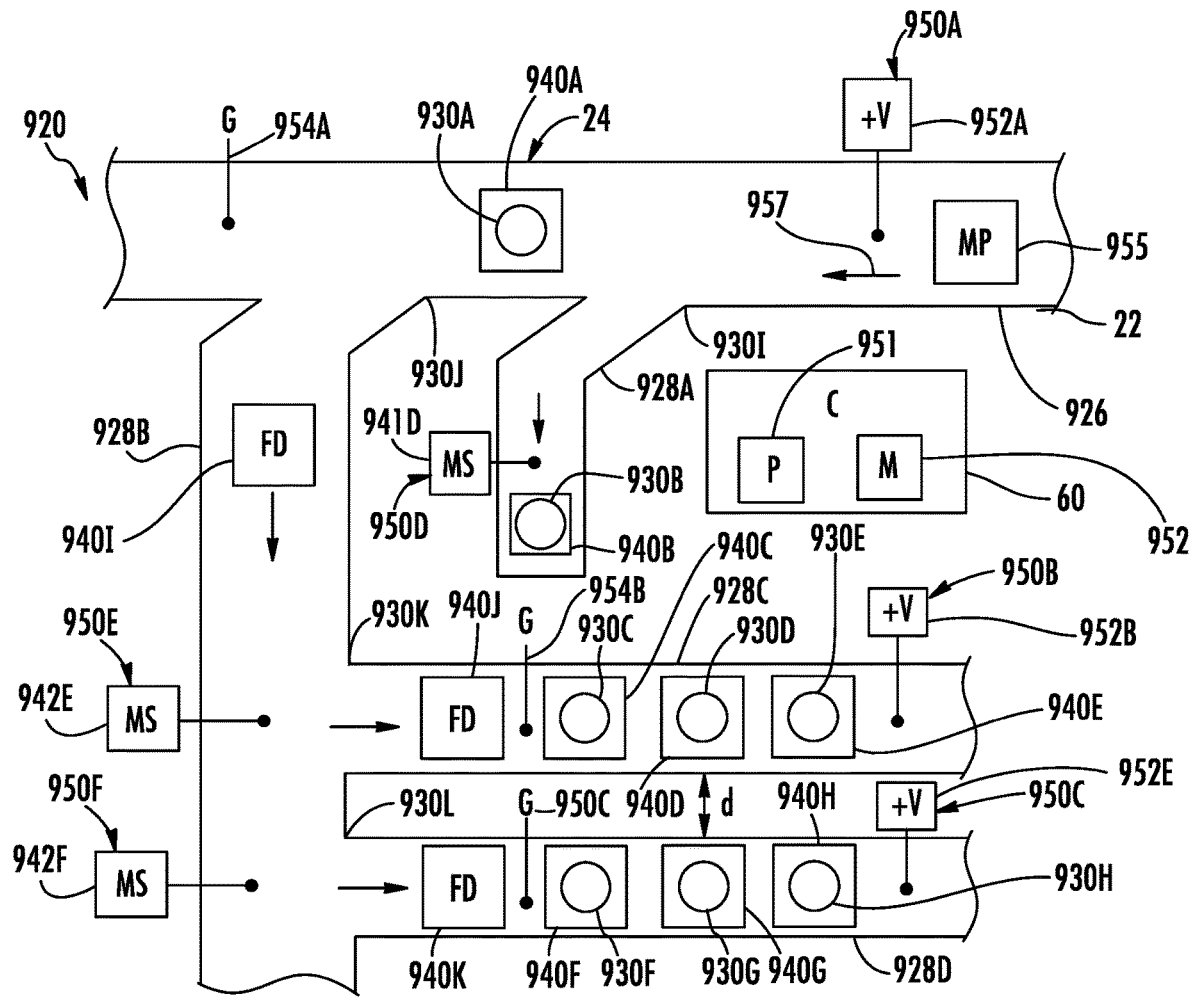
FIG. 9 is a schematic diagram of another example target constituent location and discharge system.

FIG. 9 schematically illustrates target constituent location and discharge system 920, another example of fluid fraction location discharge system 20 described above. As with system 20, system 920 identifies fractions of fluid within a microfluidic channel having a target constituent and selectively discharges the identified fractions through an exit passage from the microfluidic channel. System 920 integrates a multitude of differently selectable fluid displacement devices and fluid exit passages along with a sophisticated microfluidic channel on a single substrate or chip 22 to selectively direct targeted fractions of fluid having targeted constituents to selected locations. System 920 comprises microfluidic channel 24 which comprises primary portion 926 and branch portions 928A, 928B, 928C and 928D. Branch portions 928A and 928B branch off of or stem from primary portion 926. Branch portions 928C and 928C further branch off or stem from branch portion 928B. In one implementation, branch portions 928C and 928D are spaced from one another by a distance d of less than or equal to 42 µm and nominally less than or equal to 20 µm. Some implementations, the spacing may be less than or equal to 5 µm.

System 920 further comprises fluid exit passages 930A, 930B, 930E, 930F, 930G, 930H, 930I, 930J, 930K and 930L (collectively referred to as fluid exit passages 930), fluid displacement devices 940A, 940B, 940G, 940H, 940I, 940J (collectively referred to as fluid displacement devices 940) and constituent locators 950A, 950B, 950C, 950D and 950E (collectively referred to as constituent locators 950) and microfluidic pump 955.

As with the above described systems, system 920 additionally comprises controller 60 which is specifically illustrated as comprising a processor and 51 and a non-transitory computer readable medium or memory 952. Although controller 60 is in communication with each of the fluid displacement devices 930 and constituent locators 950, such connections are not illustrated for ease of illustration.

Fluid exit passages 930 correspond to fluid exit passages 30 described above. In the example illustrated, fluid exit passages 930A-930H comprise nozzles through which droplets or ejected. Fluid exit passages 930I-930L comprise ports interconnecting a channel in a branch channel. In the example illustrated, fluid exit passage 930I connects primary portion 926 to branch portion 928A. Fluid exit passage 930J connects primary portion 926 to branch portion 928B. Fluid exit passage 930K connects branch portion 928B to branch portion 928C. Fluid exit passage 930L connects branch portion 928B to branch portion 928D. In the example illustrated, fluid a fashion 930I and 930J are angled a fluid exit patches 930K and 930L are linear or perpendicular respect to the centerline's of the channels which they connect. Fluid exit passage 930 is differently sized, had a different cross-sectional area, as compared to another fluid exit passages 930. The different shapes or size of fluid exit passages 930 assist in guiding stitches having particular characteristics into their respective branch channel.

Fluid displacement devices 940 are similar to fluid displacement device 40 described above. Fluid displacement devices 940B-940H comprise fluid displacement devices eject drops of fluid through a corresponding fluid exit passage 930 in the form of a nozzle. In one implementation, fluid displacement devices 940B-940H comprise thermal inkjet resistors. In another implementation, fluid displacement device 940B-940H comprise piezoresistive displacement devices or other fluid injectors. Fluid displacement devices 940I-940K comprise microfluidic pumps. In the example illustrated, fluid displacement devices 940I-940K comprise inertial pumps such as bubble jet inertial pumps. Fluid displacement device 940I, upon being actuated, moves fluid within primary portion 926 of channel 24 through fluid exit passage 930J into branch portion 928B. Fluid displacement device 940J, upon being actuated, moves fluid within branch portion 928B through fluid exit passage 930K new branch portion 928C. Fluid displacement device around 940K, upon being actuated, moves fluid within branch portion 928B through fluid exit passage 930L into branch portion 928D. In the example illustrated, fluid displacement device 940B serves dual purposes. Upon being actuated, fluid displacement device 940B ejects drops a fluid to move fluid from primary portion 926 of channel 24 through fluid exit passage 930I. When a targeted fraction having a target constituents is positioned are located proximate to fluid exit passage 930B, actuation of fluid displacement device 940B further moves the fluid through fluid exit passage 930B, a nozzle.

Constituent locators 950 are similar to constituent locators 50 described above. Constituent locators 950A, 950B and 950C each comprises a constituent separator two separate fluid into a series of bands, each band having distinct contents or distinct levels or types of constituents. In the example illustrated, each of constituent locators 950A, 950B and 950C performs constituent separation through electrophoresis. Constituent locator 950A comprises a charged or active electrode 952A and ground electrode 954A. Constituent locator 950B comprises charged or active electrode 952B and ground electrode 954B. Constituent locator 950C comprises active electrode 952C and ground electrode 954C. In other implementations, constituent locators 950A, 950B and 950C may separate constituents in other manners such as through capillary zone electrophoresis, capillary gel electrophoresis, isotachophoresis, high pressure liquid chromatography, electro chromatography, liquid-liquid extraction, fractional distillation, filtration or the like.

Constituent locators 950D, 950E and 950F utilize microfluidic sensors to distinguish target fractions containing target constituents and utilize pumps to locate the targeted fractions proximate a selected fluid passage exit 930. Constituent locator 950D comprise microfluidic sensor 941D, similar to microfluidic sensor 641 described above and a shared fluid displacement device 930B serves as a pump to locate target fractions containing target constituents. Constituent locator 950E comprises microfluidic sensor 942E and a shared displacement device 940I. Constituent locator 950F comprises microfluidic sensor 942F and the shared displacement device 940I.

Microfluidic pump 955 similar to pump 640 described above. Microfluidic pump 950 moves fluid from a reservoir or fluid input along primary portion 926 of channel 24 in the direction indicated by arrow 957. In operation, processor 951 of controller 60, following instructions contained in memory 952, actuates constituent locator 950A to apply electric field across the fluid within primary portion 926 so as a separate fluid into bands, similar to as described above with respect to system 520. The different bands are serially arranged along primary portion 926. Upon such constituent separation, controller 60 selectively moves selected fluid fractions corresponding to the bands through the fluid exit passages which are aligned with such bands (or which subsequently become aligned with such bands through further pumping of the fluid by pump 955).

For example, in one implementation, the fluid fraction or band opposite to fluid exit passage 930I may contain a target constituent of interest. In such a scenario, controller 60 outputs control signals actuating fluid displacement device 930B to move the target fluid fraction through fluid exit passage 930I. Based upon the predetermined rate at which the target fluid fraction is moving through branch portion 928A (based upon the drop weight of the drop ejector formed by the nozzle of fluid exit passage 930B and fluid displacement device 940B in combination with the rate at which the drop ejector is fired) controller 60 estimates the time at which the target fluid constituent that was separated in primary portion 926 and moved through fluid and expression 930I will arrive at fluid exit passage 930B. In the example illustrated, constituent locator 950D further confirms the presence of the target fraction, containing the band of the target constituent, based upon signals received from sensor 941D. After the target fraction has arrived at fluid exit passage 930B or at the time of the predicted arrival of the target fraction, controller 60 actuates fluid displacement device 940B and locates or positions the appropriate destination for the target fraction (through actuating a valve redirecting flow from a first destination to a second destination intended to receive the target fraction or by positioning an appropriate reservoir below the nozzle of fluid exit passage 930B) to receive the discharged target fluid fraction.

In another such scenario, a fluid fraction or band resulting from the constituent separation, through its order arrangement, may be positioned opposite to fluid exit passage 930A. In such a scenario, controller 60 actuates fluid displacement device 940A to move the target fraction containing a target constituent through fluid exit passage 930A. In yet a third scenario, the fluid fraction or band resulting from the constituent separation, through its order arrangement, may positioned opposite to fluid exit passage 930J. In such scenario, controller 60 actuates fluid displacement device 940I to move the target fraction through fluid exit passionately 930J into branch portion 928B. Upon being extracted from primary portion 926, the target fraction is ready for further breaking down or refinement within branch portion 928B. It should be noted that in some implementations, constituent separation in primary portion 926 of channel 24 may be omitted, wherein the stream of mixed constituents is not separated, but is selectively transmitted without separation into branch portion 928A or branch portion 928B for subsequent possible separation or ejection.

Constituent locators 950E and 950F cooperate to distinguish further target fractions and to locate such target fractions proximate to their fluid exit passages 930K and 930L, respectively. The fluid driven by fluid displacement device 940I is sent by microfluidic sensors 942E and 942F to identify a target fraction containing a target constituent. In response to receiving signals from microfluidic sensor 942E indicating that the target fraction containing a target constituent is proximate to fluid exit passage 930K, controller 60 actuates fluid displacement device 940J to move the target fraction from branch portion 928B through fluid exit passage 930K into branch portion 928C. Likewise, in response to receiving signals from microfluidic sensor 942F indicating that the target fraction containing a target constituent is proximate to fluid exit passage 930L, controller 60 actuates fluid displacement device 940K to move the target fraction from branch portion 928B through fluid exit passage 930L into branch portion 928D.

System 920 further facilitates the separation and selective discharge of fluid fractions occupying branch portions thereof 928C and 928D. Similar to the operation of constituent locator 952A, constituent locators 950B and 950C, upon being actuated by controller 60, further separate the fluid fraction received through their respective passages 930K and 930L. The thus separated bands of different fluid fractions containing different constituents for the same constituents having different characteristics become aligned with a corresponding one of fluid exit passages 930.

The bands or fluid fractions resulting from the constituent separation within branch portion 928C become substantial aligned with fluid exit passages 930C, 930D and 930E. Those fluid fractions extending along branch portion 928C are selectively ejected through the corresponding exit passages through the actuation of the corresponding fluid displacement devices 940C, 940D and 940E. In some implementations, each of such fluid displacement device 940 within branch portion 928C are actuated to discharge each of the aligned fluid fractions. In other implementations, one or two of the fluid displacement devices 940 within branch portion 928C are actuated, whereas those fluid fractions not discharged through one of the discharge passes 930 within branch portion 928C are driven onward downstream for further disposal or subsequent constituent separation and/or interaction such as mixing with other fluids or other analytes. The operation of constituent locator 952C with respect to the fluid fraction directed into branch portion 928C in the selective discharge of fluid through selected discharge passages 930F, 930G and 930H by fluid displacement devices 940F, 940G and 940H, respectively, occurs in a similar fashion.

As demonstrated, system 920 facilitates the breaking down of a fluid in a stepwise manner to extract fluid fractions and constituents on a single integrated platform, such as on a single integrated chip or substrate. In some implementations, the use of thermal inkjet resistors as a fluid displacement devices facilitate such separation at a very small scale, a nanoliter or even pico-liter scale. Although not illustrated, in some implementations, system 920 they include additional microfluidic sensors and/or valves. The exact configuration by microfluidic channel 24 may vary depending upon the number of separation steps or levels to be applied as well as the number and type of ultimate destinations for the extracted or separated constituents.

FIGS. 10 and 11 illustrate target constituent location and discharge system 1020, another example of fluid fraction location discharge system 20 described above. As with system 20, system 1020 identifies fractions of fluid within a microfluidic channel having a target constituent and selectively discharges the identified fractions through an exit passage from the microfluidic channel. System 1020 is similar to system 420 described above except that system 1020 comprises multiple side-by-side microfluidic channels 1024 integrated along with their associated fluid exit passages and fluid displacement devices on a single substrate. System 1020 comprises substrate 22, microfluidic channels 1024A, 1024B, 1024C, 1024D (collectively referred to as channels 1024) sample load port thousand 25, waste collector port 1026, fluid exit passages 1030A, 1030B, 1030C, 1030D (collectively referred to as fluid exit passages 1030), fluid displacement devices 1040A, 1040B, 1040C, 1040D (collectively referred to as fluid displacement devices 1040) and constituent locator 1050.

Substrate 22 is described above. Microfluidic channels 1024 comprise side-by-side microfluidic channels extending from sample load port 1025 to waste collector port 1026. Microfluidic channels 1024 are similar to microfluidic channel 24 described above. Microfluidic channels 1024 receive a single fluid sample through port 1025, wherein the fluid sample occupies channels 1024.

Fluid exit passages 1030 are similar to fluid exit passages 230 described above. Fluid exit passages 1030 comprises nozzles through which fluid is ejected. Fluid displacement devices 1040 are similar to fluid displacement devices 40 described above. Fluid displacement devices 1040 cooperate with fluid exit passages 1030 form drop-on-demand drop ejectors. In the example illustrated, fluid displacement devices 1040 comprise thermal inkjet resistors. In other implementations, fluid displacement devices 1040 may comprise other devices to apply force to fluid to move fluid, such as piezo resistive drop ejectors.

Constituent locator 1050 is similar to constituent locator 450 described above. Constituent locator 1050 comprises an active charged electrode 1052 and a ground electrode 1054. In the example illustrated, electrode 1052, 1054 are formed upon an overlying substrate 1053 (shown FIG. 10) in which is also formed ports 1025 and 1026. Electrodes 1052, 1054 extend across each of channels 1024 social cooperate to form an electric field along each of channels 1024 and across fluid exit passages 1030 located between electrode with 1052, 1054.

In operation, electric current is supplied to electrode 1052 so as to form and electric field across channels 1024, causing constituents to migrate within the fluid and separate into series of bands containing different constituents or constituents of different characteristics. Upon such separation, fluid displacement devices 1040 are actuated by controller, such as controller 60 described above, to move and eject a target fluid fraction having a band of target constituent through the associated fluid exit passage 1030. As a result, multiple samples of a constituent are concurrently collected.

FIGS. 12 and 13 illustrate target constituent location and discharge system 1120, another example of fluid fraction location discharge system 20 described above. As with system 20, system 1120 identifies fractions of fluid within a microfluidic channel having a target constituent and selectively discharges the identified fractions through an exit passage from the microfluidic channel. System 1120 is similar to system 520 described above except that system 1120 comprises multiple side-by-side microfluidic channels 1124 (described above) integrated along with their associated fluid exit passages and fluid displacement devices on a single substrate. System 1120 comprises substrate 22 (described above), microfluidic channels 1124A, 1124B, 1124C, 1124D (collectively referred to as channels 1124), sample load ports 1125A, 1125B, 1125C 1125D (collectively referred to as sample load ports 1125), waste collector ports 1126A, 1126B, 1126C, 1126D (collectively referred to as waste collector ports 1126), fluid exit passages 1130A, 10306, 1130C, 1130D (collectively referred to as fluid exit passages 1130), fluid displacement devices 1140A, 1140B, 1140C, 1140D (collectively referred to as fluid displacement devices 1140) and constituent locators 1150A, 11506, 1150C and 1150D (collectively referred to as constituent locators 1150).

Substrate 22 is described above. Microfluidic channels 1124 comprise side-by-side microfluidic channels extending from a corresponding one of sample load ports 1025 to a corresponding one of waste collector ports 1126. Microfluidic channels 1124 are similar to microfluidic channel 24 described above. Microfluidic channels 1124 receive different fluid samples through their respective ports 1125, wherein the fluid sample occupies channels 1124.

Fluid exit passages 1130 are similar to fluid exit passages 230 described above. Fluid exit passages 1130 comprises nozzles through which fluid is ejected. Fluid displacement devices 1140 are similar to fluid displacement devices 40 described above. Fluid displacement devices 1140 cooperate with fluid exit passages 1130 form drop-on-demand drop ejectors. In the example illustrated, fluid displacement devices 1140 comprise thermal inkjet resistors. In other implementations, fluid displacement devices 1140 may comprise other devices to apply force to fluid to move fluid, such as piezo resistive drop ejectors.

Constituent locators 1150 are each similar to constituent locator 450 described above. Constituent locators 1150 each comprises an active charged electrode 1152 and a ground electrode 1154. In the example illustrated, electrodes 1152, 1154 are formed upon an overlying substrate 1153 (shown FIG. 12) in which is also formed ports 1125 and 1126. Electrodes 1052, 1054 extend across each of channels 1024 so as to cooperate to form an electric field along each of channels 1124 and across fluid exit passages 1130 located between electrodes 1152, 1154.

In operation, electric current is supplied to each electrode 1152 so as to create an electric field across channels 1124, causing constituents to migrate within the surrounding fluid and separate into a series of bands containing different constituents or constituents of different characteristics. Upon such separation, fluid displacement devices 1140 are selectively actuated by controller, such as controller 60 described above, to move and eject a target fluid fraction containing a band of a target constituent through the associated fluid exit passage 1130. As a result, multiple different samples of multiple constituents are concurrently collected.

Figure 14:
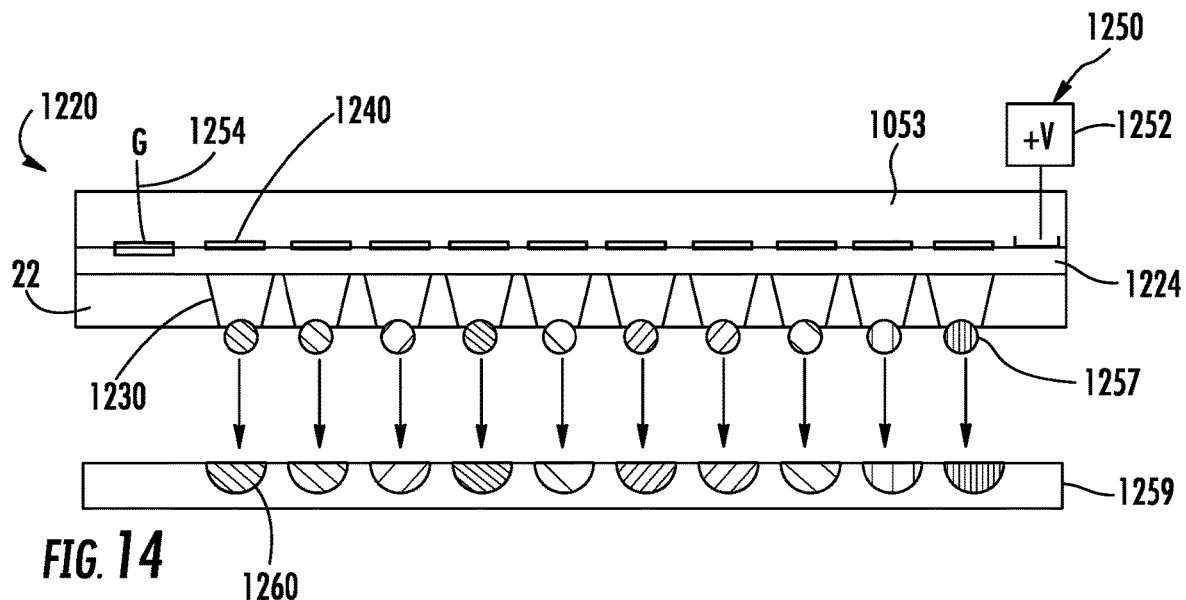
FIG. 14 is a sectional view illustrating another example target constituent location and discharge system discharging fluid fractions to an example receiver.

FIG. 14 is a sectional view illustrating the ejection of multiple target fluid fractions containing different target constituents from a single microfluidic channel 1224 of an example target constituent location and discharge system 1220. System 1220 is similar to system 1120 described above except that system 1220 comprises 10 pairs of fluid exit passages 1230 and corresponding fluid displacement devices 1240. Exit passage 1230 and fluid displacement devices 1240 are similar to exit passages 230 and fluid displacement devices 40 described above.

System 1220 comprises constituent locator 1250 which is similar to constituent locator 1150 described above, wherein an electric field is applied across fluid contained within microfluidic channel 1224 to separate constituents of the fluid into bands or fluid fractions substantially aligned with the fluid exit passages 1230 and wherein a controller, such as controller 60 described above, outputs control signals selectively actuating individual fluid displacement devices 1242 eject droplets from the respective fluid fractions through the nozzles serving as fluid exit passages 1230. In the example illustrated, such fluid fractions 1257 ejected from respective fluid exit passages 1230 are deposited upon a reservoir or reservoir array or onto an analysis substrate 1259 having multiple individual sample collection reservoirs 1260. In one implementation, substrate 1259 comprises a nano wire surface of a surface-enhanced Raman spectroscopy (SERS) substrate. In one implementation, the nozzles forming fluid exit passages 1230 are shaped to match or correspond to the expected shape of the fraction of fluid to be ejected or band formed by such electrophoretic or other constituent separation. For example, in one implementation, the nozzle may have a square or rectangular shape.

Figure 15:
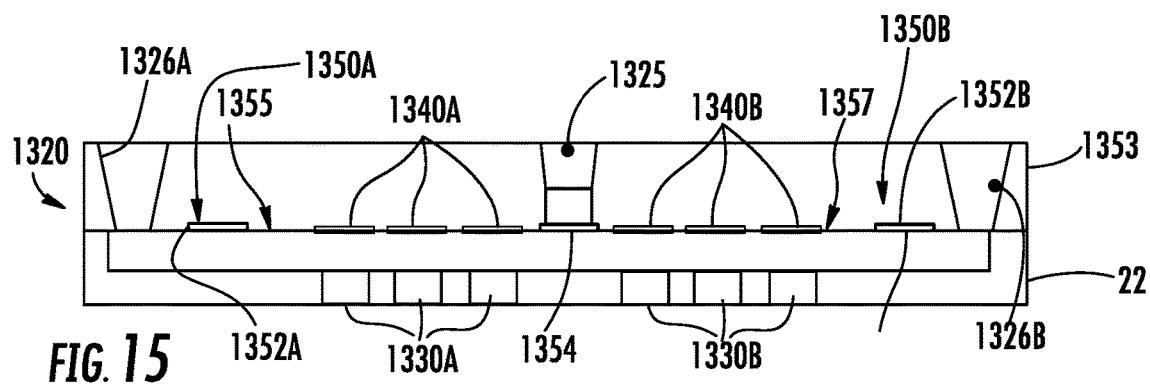
FIG. 15 is a sectional view of another example target constituent location and discharge system.
Figure 16:
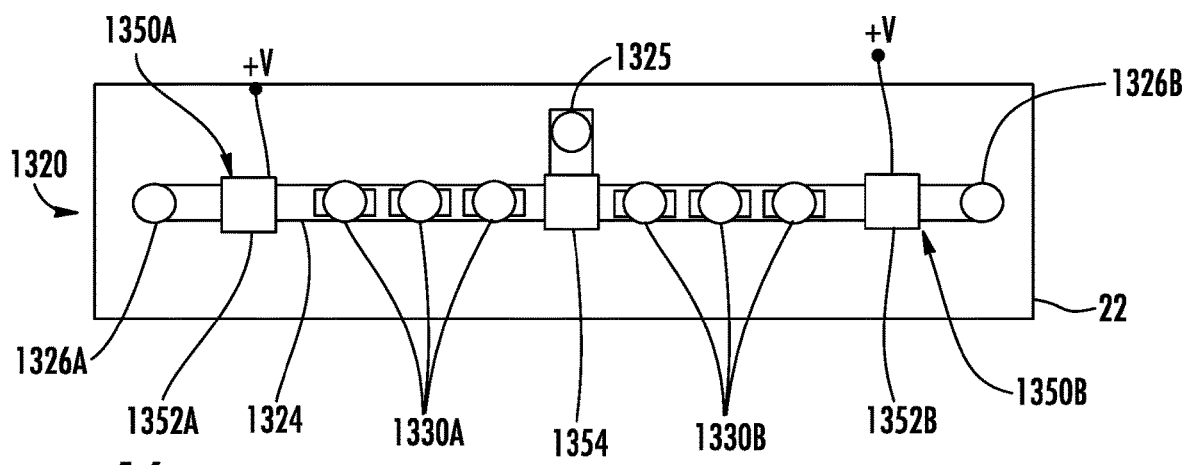
FIG. 16 is a top view of the system of FIG. 15.

FIGS. 15 and 16 illustrate target constituent location and discharge system 1320, another example of fluid fraction location discharge system 20 described above. As with system 20, system 1320 identifies fractions of fluid within a microfluidic channel having a target constituent and selectively discharges the identified fractions through an exit passage from the microfluidic channel. System 1320 is similar to system 520 described above except that system 1320 comprises two different constituent locators operating upon fluid within a single microfluidic channel. System 1320 comprises substrate 22 (described above), microfluidic channel 1324, sample load port 1325, waste collector ports 1326A, 1326B, fluid exit passages 1330A, 1330B (collectively referred to as fluid exit passages 1330), fluid displacement devices 1340A, 1340B (collectively referred to as fluid displacement devices 1340) and constituent locators 1350A, 1350B (collectively referred to as constituent locators 1350).

Substrate 22 is described above. Microfluidic channel 1324 is similar to microfluidic channel 24 described above. Microfluidic channel 1124 comprises to portions: a first portion 1355 extending from sample load port 1325 to waste collector port 1326A and a second portion 1357 extending from sample load port 1325 to waste collector port 1326B.

Fluid exit passages 1330 are similar to fluid exit passages 230 described above. Fluid exit passages 1330 comprises nozzles through which fluid is ejected. Fluid displacement devices 1340 are similar to fluid displacement devices 40 described above. Fluid displacement devices 1340 cooperate with fluid exit passages 1330 form drop-on-demand drop ejectors. In the example illustrated, fluid displacement devices 1340 comprise thermal inkjet resistors. In other implementations, fluid displacement devices 1340 may comprise other devices to apply force to fluid to move fluid, such as piezo resistive drop ejectors.

Constituent locators 1350 are each similar to constituent locator 450 described above. Constituent locators 1350A and 1350B comprise an active charged electrode 1352A, 1152B, respectively and share a ground electrode 1354. In the example illustrated, electrodes 1352 and 1154 are formed upon an overlying substrate 1353 (shown FIG. 15) in which is also formed ports 1325 and 1326. Electrodes 1352A, 1054 are located on opposite ends of portion 1355 of channel 1324 so as to sandwich fluid exit passages 1330A and their corresponding fluid displacement devices 1340A therebetween. Electrodes 1352A, 1054 cooperate to form an electric field along portion 1355 and across fluid exit passages 1130A. Similarly, Electrodes 1352B, 1054 are located on opposite ends of portion 1357 of channel 1324 so as to sandwich fluid exit passages 1330B and their corresponding fluid displacement devices 1340B therebetween. Electrodes 1352B, 1054 cooperate to form an electric field along portion 1357 and across fluid exit passages 1130B.

In operation, electric current is supplied to each electrodes 1352A, 1352B so as to create electric fields across portion 1355 and 1357 of channel 1324, separating constituents within the fluid by electrophoresis so as to form a series of bands of fluid fractions containing different constituents or constituents of different characteristics. In one implementation, constituent locators 1350A, 1350B concurrently apply different charges to electrodes 1352A, 1352B so as to concurrently form a different electric field along portion 1355 as compared to portion 1357. In some implementations and with some fluids, the different electric fields separate constituents differently and/or form bands with different characteristics. Upon such separation, fluid displacement devices 1340A, 1340B are selectively actuated by controller, such as controller 60 described above, to move and eject a target fluid fraction having a target constituent through the associated fluid exit passage 1330.

Although the present disclosure has been described with reference to example implementations, workers skilled in the art will recognize that changes may be made in form and detail without departing from the spirit and scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. An apparatus comprising:
 a microfluidic channel;
 a fluid exit passage at a location along the microfluidic channel;
 a fluid displacement device proximate the location along the microfluidic channel;

a constituent locator configured to distinguish a target constituent in a fluid within the microfluidic channel from remaining non-target constituents in the fluid and to locate the distinguished target constituent proximate the fluid exit passage; and a controller configured to selectively actuate the fluid displacement device when the target constituent is proximate the fluid exit passage to discharge the target constituent from the microfluidic channel through the fluid exit passage, the fluid exit passage to eject the target constituent toward an analysis substrate.

2. The apparatus of claim 1, wherein the constituent locator separates constituents of the fluid within the microfluidic channel into a series of bands running along the microfluidic channel and having distinct constituent concentrations, one of the bands including the target constituent.

3. The apparatus of claim 1, wherein the constituent locator comprises:

a first electrode along the microfluidic channel; and a second electrode along the microfluidic channel, the second electrode cooperating with the first electrode to apply an electric field to a fluid within the microfluidic channel between the first electrode and the second electrode to separate the constituents into a series of bands running along the microfluidic channel, wherein one of the series of bands includes the target constituent.

4. The apparatus of claim 2 comprising:

a series of fluid exit passages, including the fluid exit passage, spaced along the microfluidic channel, wherein the series of fluid exit passages correspond to the series of bands of distinct constituent concentrations; and a series of fluid displacement devices, including the fluid displacement device, corresponding to the series of fluid exit passages, wherein the controller is to identify which of the fluid displacement devices of the series and which of the fluid exit passages of the series of fluid exit passages are proximate the target constituent and is to actuate the identified fluid displacement device to move the target constituent through the identified fluid exit passage.

5. The apparatus of claim 2 comprising:

a series of fluid exit passages, including the fluid exit passage, spaced along the microfluidic channel, wherein the series of fluid exit passages corresponds to the series of bands having distinct constituent concentrations; and a series of fluid displacement devices, including the fluid displacement device, corresponding to the series of fluid exit passages, wherein the controller is to actuate a plurality of fluid displacement devices of the series of fluid displacement devices to selectively move a plurality of the bands of the series of bands through a corresponding plurality of fluid exit passages of the series of fluid exit passages.

6. The apparatus of claim 2, wherein the controller is to track movement of the series of bands along the microfluidic channel and is to selectively actuate the fluid displacement device when a band containing the target constituent has been sequentially moved into proximity with the fluid exit passage.

7. The apparatus of claim 2, wherein the fluid exit passage comprises a nozzle that is arranged with the analysis substrate to deposit the target constituent into the analysis substrate.

8. The apparatus of claim 2, further including another fluid exit passage fluidically connected to a second microfluidic channel branching off of the microfluidic channel.

9. The apparatus of claim 8 further comprising:

a second fluid exit passage along the second microfluidic channel;

a second fluid displacement device proximate the location along the microfluidic channel; and a second constituent locator to distinguish a second target constituent in a fluid within the second microfluidic channel from remaining non-target constituents, wherein the controller is to selectively actuate the second fluid displacement device when the second target constituent is proximate the second fluid exit passage to discharge the second target constituent from the second microfluidic channel through the second fluid exit passage and to eject the second target constituent toward the analysis substrate.

10. The apparatus of claim 1, wherein the constituent locator comprises a fluid sensor that identifies the target constituent in the fluid in the microfluidic channel.

11. The apparatus of claim 1 comprising a plurality of differently sized fluid exit passages spaced along the microfluidic channel, including the fluid exit passage.

12. The apparatus of claim 1, wherein:

the constituent locator includes a constituent separator device to separate the fluid within the microfluidic channel into a series of bands having distinct constituent concentrations along the microfluidic channel;

a series of spaced fluid exit passages along the microfluidic channel, including the fluid exit passage; and a series of fluid displacement devices along the microfluidic channel, including the fluid displacement device proximate the location along the microfluidic channel, each of the fluid displacement devices including a drop ejector corresponding to one of the spaced fluid exit passages and located to selectively move one of the bands of the fluid through a corresponding fluid exit passage.

13. The apparatus of claim 1, wherein the controller is to track movement of the target constituent along the microfluidic channel and to time the discharge of the distinguished target constituent from the microfluidic channel through the fluid exit passage when the distinguished target constituent is proximate to the fluid exit passage.

* * * * *